United States Patent [19]

Lunzer et al.

[11] Patent Number: 5,073,709

[45] Date of Patent: Dec. 17, 1991

[54] ELECTROSTATIC SPRAY APPLICATOR WITH TWO-CHANNEL OPTICAL MONITORING SYSTEM

[75] Inventors: Lawrence J. Lunzer, St. Louis Park, Minn.; Carl D. Jacobsen, Hudson, Wis.

[73] Assignee: Graco Inc., Minneapolis, Minn.

[21] Appl. No.: 682,681

[22] Filed: Apr. 9, 1991

[51] Int. Cl.[5] .............. G01J 3/50

[52] U.S. Cl. .............. 250/226; 250/227.23; 239/691; 239/695

[58] Field of Search .............. 250/226, 227.23; 239/691, 692, 693, 694, 695

[56] References Cited

U.S. PATENT DOCUMENTS

| | | | |
|---|---|---|---|
| 2,196,166 | 4/1940 | Bryce . | |
| 4,045,667 | 8/1977 | Hanson | 280/226 |
| 4,223,216 | 9/1980 | Quick et al. | 250/226 |
| 4,356,396 | 10/1982 | Ruell et al. | 250/227.23 |
| 4,362,358 | 12/1982 | Hafle | 350/96.16 |
| 4,467,961 | 8/1984 | Coffee et al. | 239/691 |
| 4,517,456 | 5/1985 | Halsall et al. | 250/226 |
| 4,545,536 | 10/1985 | Avidon | 239/695 |
| 4,549,085 | 10/1985 | Ulijasz | 250/551 |
| 4,703,891 | 11/1987 | Jackson et al. | 239/691 |
| 4,857,726 | 8/1989 | Kinney et al. | 250/226 |
| 4,908,813 | 3/1990 | Ojima et al. . | |
| 4,923,123 | 5/1990 | Rutz et al. | 239/691 |
| 4,942,294 | 7/1990 | Witte | 250/227.14 |

*Primary Examiner*—David C. Nelms
*Assistant Examiner*—T. Davenport
*Attorney, Agent, or Firm*—Paul L. Sjoquist

[57] ABSTRACT

An electrostatic spray applicator system of the type utilizing pressurized air from an external source to develop the electrical voltage driving conditions within a spray applicator. The electrical operating conditions are represented by electrical signal generating devices within the applicator, and these electrical signals are converted intq optical signals within the applicator for transmission to a remote source. The optical signals are received at the remote source and converted back into electrical signals corresponding to the parameters being measured, and are subsequently converted into decimal display values for visualization by an operator.

13 Claims, 3 Drawing Sheets

ELECTROSTATIC SPRAY APPLICATOR WITH TWO-CHANNEL OPTICAL MONITORING SYSTEM

BACKGROUND OF THE INVENTION

The present invention relates to devices for electrostatic spraying; more particularly, the invention relates to a system for monitoring voltage and current parameters of an electrostatic spraying gun or device, and for transmitting the monitored values to a remote location under nonhazardous conditions.

In the field of electrostatic spraying, and particularly electrostatic spraying of liquids having volatile components such as paint materials, there is a need to provide a safe operating environment for the spraying equipment. The principle of electrostatic spraying necessarily involves the use of a high voltage in a volatile environment, wherein it is desired to maintain a close control over operating current in order to avoid a combination of circumstances wherein ignition of the solvent vapors in the environment is possible. Therefore, a careful monitoring of the voltage and current operating conditions is necessary, and when the combination of current and voltage exceeds predetermined values the electrostatic system must be either shut down or reduced to safe operating conditions. A number of safety devices have been developed in the prior art in order to address this problem, some of which are summarized in the following paragraphs.

Since electrostatic spray devices always operate in a paint spray booth environment, in a volatile vapor environment, care must be taken to shield or isolate any electrical circuits associated with the equipment. It is desirable to wholly isolate the electrical equipment outside the spray booth from any electrical connection to the equipment operating within the spray booth. In the case of the electrostatic spray gun, the development of the air-powered electrical generating system described in U.S. Pat. No. 4,290,091, issued Sep. 15, 1981, and U.S. Pat. No. 4,219,865, issued Aug. 26, 1980, has permitted the electrical generation equipment for electrostatic voltages to be wholly confined within the spray booth, without exterior voltage connections. The present invention maintains this electrical isolation with respect to the voltage and current monitoring equipment associated with the spray gun. Therefore, the present invention enables an electrostatic spraying system to be operated within a paint spray booth, and the voltage and current operating conditions to be monitored outside the paint spray booth, in complete electrical isolation, so that no electrical conductors pass through the barriers between the paint spray booth and the outside environment.

Reference should be made to co-pending U.S. Pat. application Ser. No. 478,276 and Ser. No. 478,277, filed Feb. 9, 1990, for a disclosure of circuits within the spray apparatus of the aforementioned type, wherein the electrostatic voltage developed within the spray applicator may be monitored and converted into a variable frequency signal, and wherein the electrostatic current developed within the aforementioned apparatus may be converted into a variable frequency signal. The circuits described in the foregoing co-pending applications are utilized in conjunction with the present invention, to provide the necessary variable frequency signals representative of voltage and current which the present invention utilizes. The respective disclosures of the co-pending applications are incorporated by reference herein.

SUMMARY OF THE INVENTION

The present invention utilizes a voltage/frequency conversion circuit within the spray gun apparatus to convert measurements of voltage and current into frequency variations, and utilizes an electrical/optical conversion arrangement to convert the frequency into optical signals of predetermined frequencies, which are then transmitted via fiber optic cables to a receiver remotely located outside of the spray booth environment. The receiver includes light filter components to separate the various light frequency signals into corresponding individual frequencies representative of voltage and current, and converts these signals into electrical signals for presentation to a monitoring circuit.

It is a principal object of the present invention to provide a system for monitoring electrostatic voltages and currents at a remote location, wherein the monitoring system is wholly electrically isolated.

It is another object of the present invention to provide a system for converting electrical signals representative of voltage and current into dual-frequency light signals for transmission via fiber optic cables.

It is another object of the present invention to minimize the number of connecting cables between an electrostatic spray system and the external environment.

It is a feature and advantage of the present invention to provide a single fiber optic cable connection to an electrostatic spray system, for conveying both voltage and current information to a remote location, indicative of the electrostatic operating conditions.

BRIEF DESCRIPTION OF THE DRAWINGS

The foregoing and other objects and advantages of the invention will become apparent from the appended specification and claims, and with reference to the drawings, in which:

FIG. 3 shows an electrical schematic of the electrical conversion circuitry; and.

DESCRIPTION OF THE PREFERRED EMBODIMENT

Figure 1:
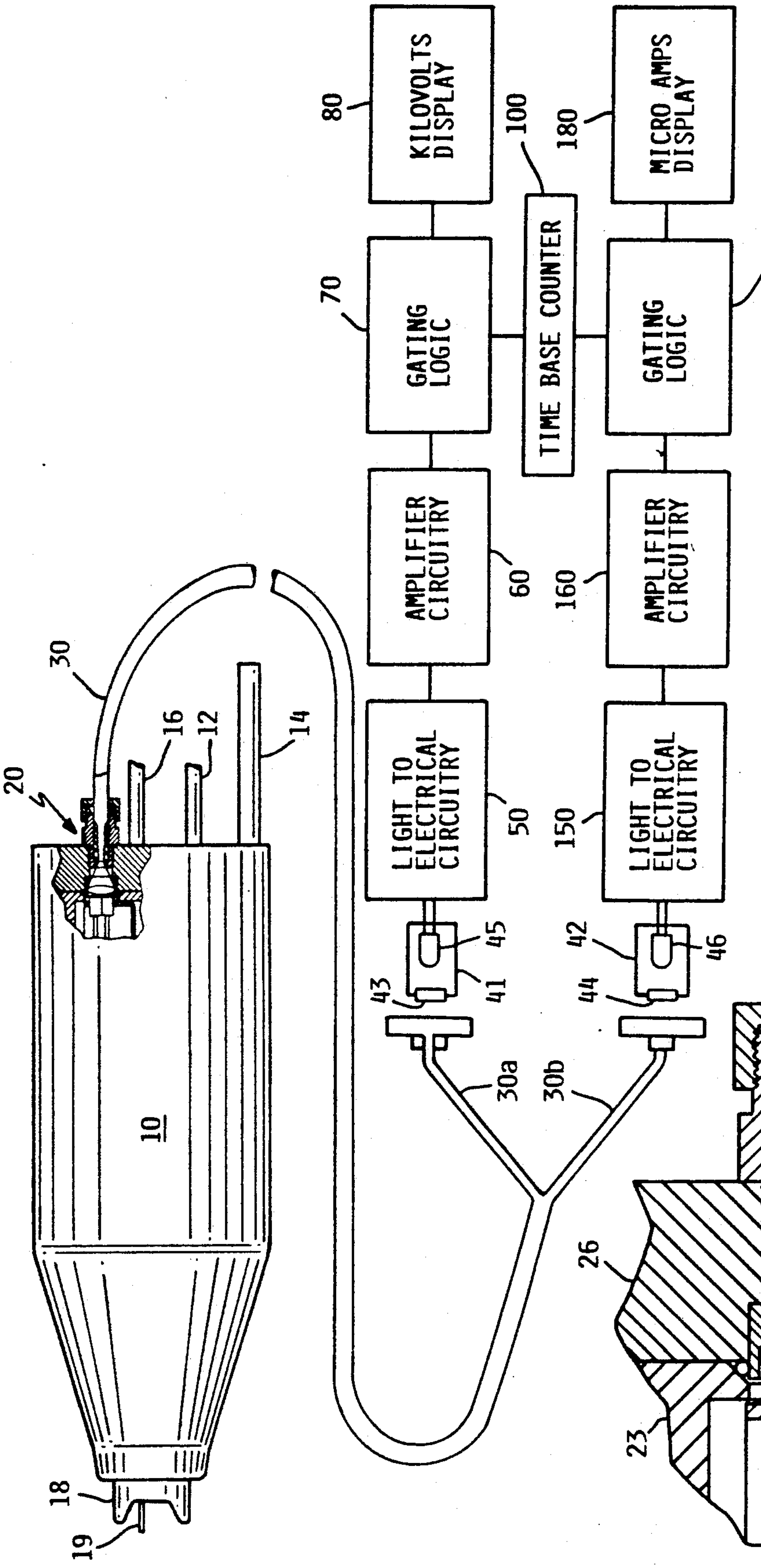
FIG. 1 shows a pictorial block diagram of the invention.

Referring first to FIG. 1, there is shown a pictorial block diagram of the invention. A spray applicator 10 is physically located within a paint spray booth, typically at an industrial or manufacturing site. Spray applicator 10 is characterized by its utilization of an internal electrical power supply which is wholly self-contained, and which derives its energy for developing a high-voltage electrostatic output field from pressurized air which is delivered through one or more air hoses 12 connected to applicator 10. Applicator 10 may be fixedly mounted within a paint spray booth by a mounting bracket 14, or it may be mounted via bracket 14 to a robotic mechanism for movement about the spray booth. Applicator 10 also has an inlet conduit 16 for supplying paint or other coating material to the applicator, and the material is atomized via a spray nozzle 18 at the front end of applicator 10. A high-voltage electrostatic field is developed at the front end of applicator 10, by applying a high voltage to an electrode 19, which projects from the front end of applicator 10 proximate the spray nozzle outlet opening.

One form of applicator 10 which is uniquely adaptable for use in conjunction with the present invention is a spray applicator manufactured by the assignee of the present invention, under the product designation PR04600. The general operating features and characteristics of an air turbine-operated applicator are disclosed in U.S. Pat. Nos. 4,290,091 (Sep. 15, 1981); 4,462,061 (July 24, 1984); 4,219,865 (Aug. 26, 1980); and 4,377,838 (Mar. 22, 1983).

The pressurized air supplied to applicator 10 through the one or more hoses 12 may in actual practice consist of a plurality of air supply lines. For example, one air supply line may provide pressurized air for operating the air turbine, which generates the electrical voltage via a generator and high-voltage circuit; one air supply line may provide air for atomization of the paint spray at the nozzle 18 of applicator 10; one air supply line may provide pressurized air for controlling the sprayed particle distribution; one pressurized air line may operate a paint valve; other air lines may be utilized to operate fluid regulators.

Figure 2:
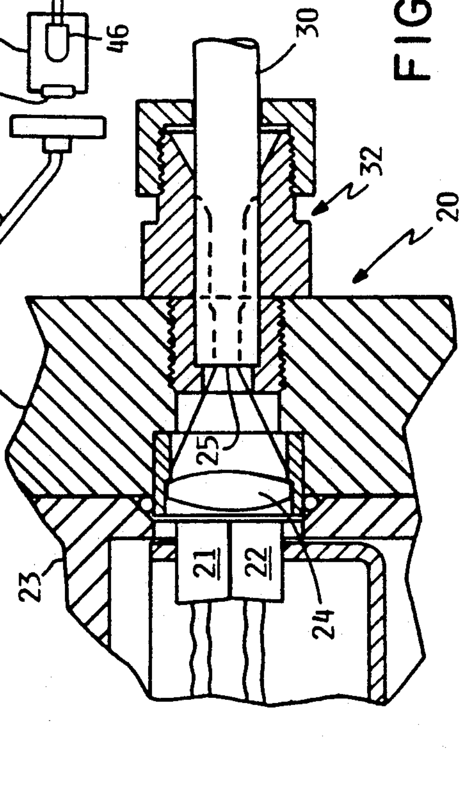
FIG. 2 shows an enlarged cross section of a portion of FIG. 1.

FIG. 1 also shows, in partial breakaway and cross section, an electro-optical circuit 20 which forms a part of the present invention. The electro-optical circuit 20 is shown in expanded view in FIG. 2. A pair of light-emitting diodes 21, 22 are affixed in the body 23 of applicator 10. These light-emitting diodes are respectively connected via conductors to electrical circuits within applicator 10, one electrical circuit providing a signal directly proportional to the output electrostatic voltage of applicator 10, and the other circuit providing a signal directly proportional to the output current of applicator 10. Under typical operating conditions, applicator 10 may develop an electrostatic high-voltage output in the range of 0–90 kilovolts DC (kvdc), and may develop a current in the range of 0–250 microamps (uA). The electrical signals which drive light-emitting diodes 21, 22 are therefore respectively representative of these output parameters, in the form of a constant amplitude signal which varies in frequency. For example, light-emitting diode 21 receives a signal varying between 0–1000 hertz (Hz), which is representative of the current range 0–250 uA; light-emitting diode 22 receives a constant voltage signal in the frequency range 0–3600 Hz, which is representative of the 0–90 kvdc output voltage. Light-emitting diodes which have been found suitable for the present invention are manufactured by Marktech of Menands, New York; light-emitting diode 21 is available as Marktech Part No. MT400-CUG, and this light-emitting diodes emits a green optical color signal; light-emitting diode 22 is a Marktech Part No. MT400-CUR, which is a light-emitting diode emitting a red optical color. The peak wavelength of light-emitting diode 21 is 567 nanometers (nm); and the peak wavelength of light-emitting diode 22 is 660 nanometers (nm). Both light-emitting diodes 21, 22 are affixed adjacent a focusing lens 24, and lens 24 is designed to focus the received optical signals onto the end 25 of a fiber optic cable 30. Fiber optic cable 30 is affixed against the rear wall 26 of applicator 10 by a suitable fitting 32. The preferred embodiment utilizes a fiber optic cable 30 having 64 optical fibers, for transmitting light signals received at end 25 to the opposite end of fiber optic cable 30. The other end of fiber optic cable 30 is split into two equal sections 30*a* and 30*b*, each section having 32 optical fibers. The splitting of the fiber optic cable 30 into two equal halves divides the optical signals thereon, and therefore section 30*a* and 30*b* each convey an equal, composite optical signal which corresponds to the optical signal received at input 25.

The optical signal transmitted by fiber optic section 30*a* is coupled to a sensor module 41, utilizing a connector generally similar to connector 32. Likewise, the optical signal conveyed by fiber optic cable section 30*b* is connected to a sensor module 42, by a similar connector. Sensor module 41 comprises a red filter 43, and sensor module 42 comprises a green filter 44. The filters 43, 44 may be obtained from Panelgraphic Corporation of West Caldwell, New Jersey. For example, filter 43 may be a Panelgraphic filter designated as "Red 65" which has a wavelength pass band proximate the wavelength of the red color; i.e., 660 nm., therefore effectively transmitting only the red signal. Filter 43 blocks all wavelengths below about 600 nm, and therefore effectively blocks any green color signals. Filter 44 is a Panelgraphic type "green 50" filter, which has a wavelength pass band including 567 nm., therefore effectively transmitting only the green signal. Filter 44 blocks all wavelengths above 600 nm, and therefore effectively blocks all red color signals.

Sensor modules 41, 42 also each include a color sensor, the respective color sensors being uniquely sensitive to the respective wavelengths transmitted through the filters. Typical color sensors are available from Sharp Electronics Corporation. For example, color sensor 45 may be a Sharp Type PD150, and sensor 46 may be a Sharp Type PD151; each of these color sensors are selected for its ability to be responsive to colors of the selected wavelengths, and each color sensor generates an electrical signal which is representative of the respective color signal received by the sensor.

The electrical output signal from sensor 45 is transmitted to a conversion circuit 50, which develops an electrical pulse signal corresponding to the optical pulse signal received by sensor 45. This electrical pulse signal is transmitted to an amplifier circuit 60 which develops an increased amplitude signal of the same frequency. The output signal from amplifier circuit 60 is transmitted to a logic circuit 70 for developing a digital representation of the frequency received from amplifier 60. The output from logic circuit 70 is transmitted to a visual display 80, which converts the digital signal into a display signal for visualization by an operator.

The electrical signal output from sensor 46 is transmitted to a conversion circuit 150, which develops an electrical frequency signal corresponding to the optical signal received by sensor 46. The output from circuit 150 is transmitted to an amplifier circuit 160, which develops an increased amplitude signal of the same frequency. The output from amplifier circuit 160 is transmitted to a logic circuit 170 for converting the electrical frequency signal into a digital representation signal, and this digital signal is transmitted to a display circuit 180 for providing an operator visualization of the input signal. Display circuit 80 provides a digital visualization of the output voltage of applicator 10, in kilovolts; display circuit 180 provides a visualization of the output current of applicator 10 in microamps.

Figure 3:
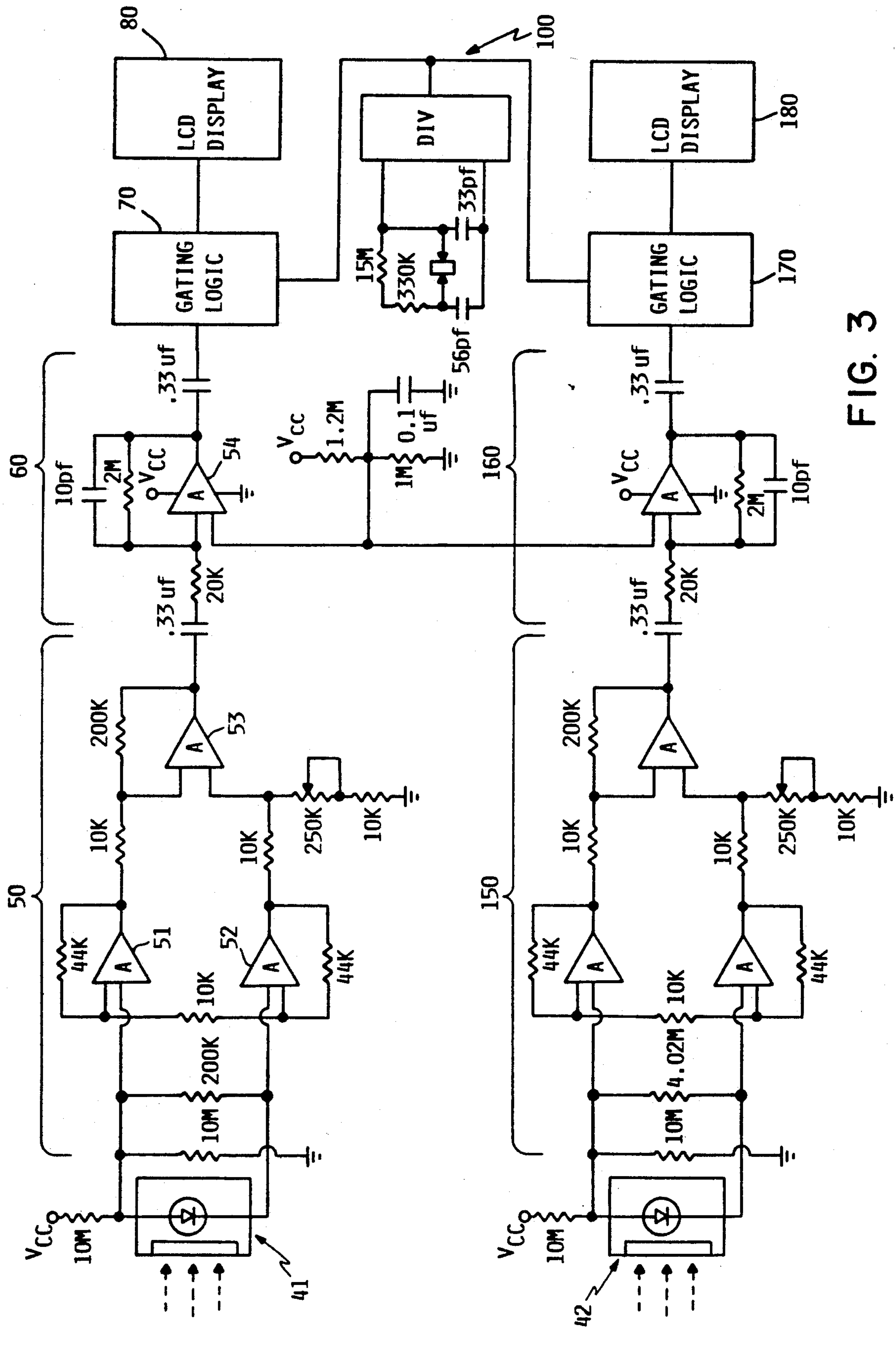

Gating logic circuit 70 and gating logic circuit 170 are each controlled by a time-base counter 100, which is shown in FIGS. 1 and 3. Time-base counter 100 utilizes a crystal frequency generator which develops a frequency signal of 32,768 Hz. This signal is coupled into a divider circuit (DIV) and reproduces an output gating signal of 2 Hz. The output gating signal is coupled to gating logic 70 and 170, to develop the required control signals for operating LCD display 80 and LCD display 180. The DIV circuit is a commercially available semiconductor, for example National Semiconductor type CD4060.

Referring next to FIG. 3, there is shown an electrical schematic diagram of circuits 50, 60, 150 and 160. Circuits 50 and 60 are essentially duplications of circuit 150 and 160, and therefore an explanation of one set of circuits will suffice in understanding the invention. In all cases, the amplifiers designated "A" are semiconductor circuits manufactured by National Semiconductor, under type designation LMC660. The output signal from sensor module 41 is coupled to respective inputs of amplifiers 51 and 52. The outputs from amplifier 51 and 52 are fed into amplifier 53, thereby producing an output signal of constant voltage and variable frequency, the frequency being proportional to the input optical signal received by sensor module 41. The output signal from amplifier 53 is coupled into a further amplifier 54, where it is developed into a series of pulses at a repetition rate corresponding to the optical frequency input.

The pulse train from amplifier 54 is coupled into a logic circuit 70 which may be comprised of any of a number of commercially available circuits. The function of logic circuit 70 is to convert the pulse signals from amplifier 54 into a digital count value, the count value being representative of the optical input frequency. One such commercially available counter circuit which may be utilized for this purpose is manufactured by National Semiconductor, under type designation MM74C946. The output from logic circuit 70 is coupled into a display circuit of a commercially available type; for example, a liquid crystal display may be used to provide a decimal representation of the input optical frequency, and thereby provide a decimal representation of the kilovolts developed by spray applicator 10. A typical display circuit 80 which may be utilized which the present invention is obtainable from the Hamlin LCD, division of Standish Corporation, Lake Mills, Wisconsin, under type designation Hamlin 3938.

Figure 4:
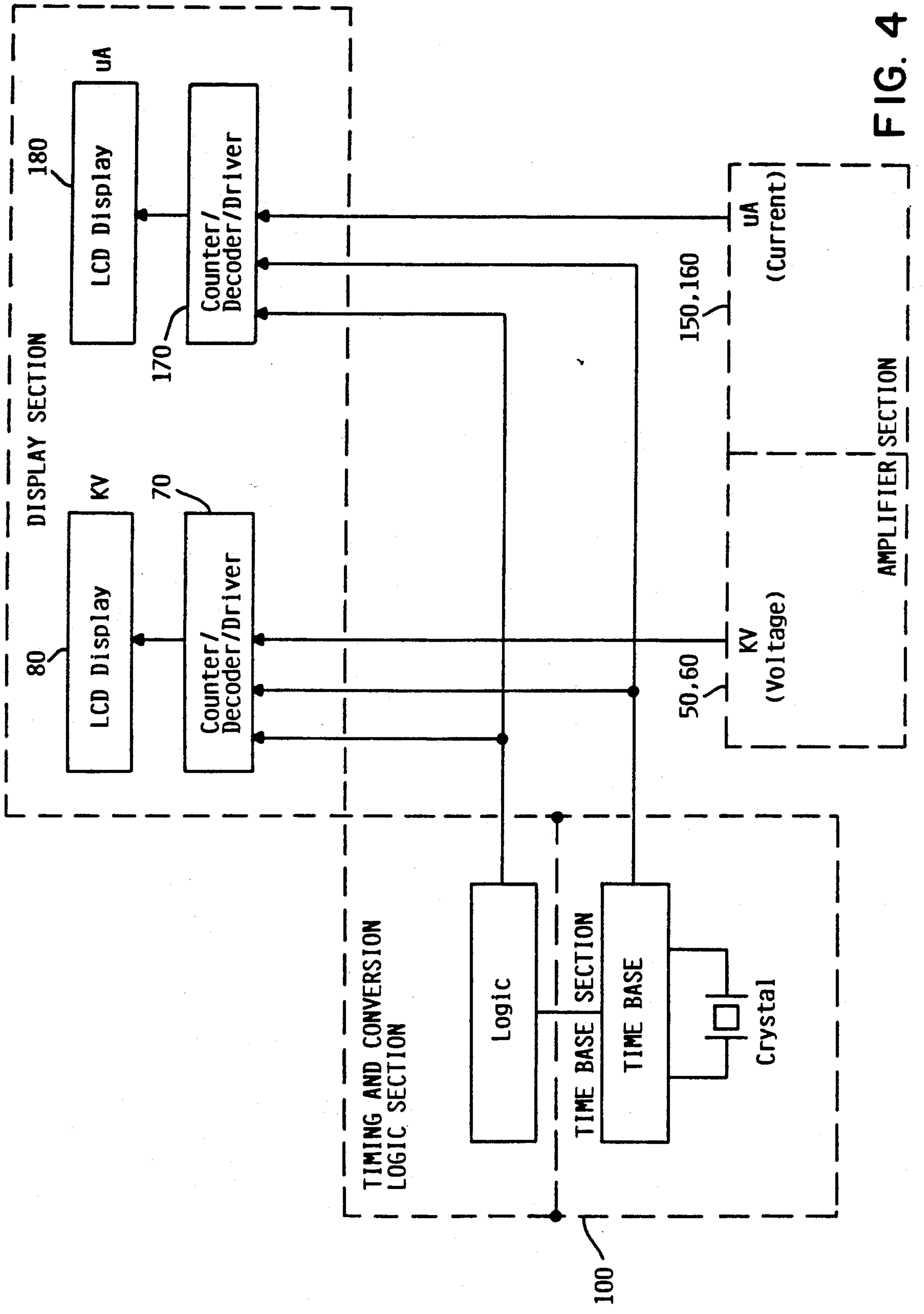
FIG. 4 shows another illustration of the electrical circuits.

The overall operation of the gating logic and LCD display is controlled by circuit 100, which generates a timing signal every 250 milliseconds. This timing signal is converted into a series of sequential gating signals, to permit the serial pulse streams of the respective two channels to be gated into the LCD logic circuits for a fixed time interval (i.e. 250 milliseconds). Another representation of the electrical circuits associated with the present invention is shown in FIG. 4. This representation illustrates the information flow and gating control paths, wherein a serial stream of pulses are coupled from the amplifier section of each of the two channels into the respective display section channels. The serial stream is gated for a predetermined time interval (i.e. 250 milliseconds), which is controlled by the time-base section and the timing and conversion logic section. The timing and conversion logic section permits the counter/decoder/driver circuits to receive a serial string of pulses from the amplifier section for a predetermined time interval. The count value of serial signals received during this time interval is then decoded to set up the conditions for driving an LCD display, and the decoded count value appears as a decimal value in the LCD display window. The serial string of pulses from the amplifier sections to the display section are periodically updated by the timing and conversion logic section, so that the decimal display values are updated on a regular basis.

The circuits associated with sensor module 46 are virtually identical to the circuits associated with sensor module 45. The output visual display formed in display circuit 180 is a decimal value representative of the applicator 10 current, displayed in microamps.

Applicator 10 and its various optical, air and paint connections are all located within a spray booth environment; the air, optical and paint lines which are connected to applicator 10 are brought out through the walls of the spray booth to various remote locations. In the case of fiber optic cable 30, as well as the circuits represented in FIGS. 1 and 2, may be remotely located at an operator position, to enable the operator to obtain a continuous view of the voltage and current performance parameters of the spray applicator 10. As a result, the electrical signals which are necessary for developing the digital display values are wholly electrically isolated from the spray applicator, and there is no interconnection between the spray applicator and the circuits requiring any bridging electrical connections. This greatly reduces the fire and explosion hazards which might otherwise exist in electrostatic spray applicator systems of other types.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An electrostatic spraying system having a self-contained electrostatic power supply in a spray applicator, with means in the applicator for developing a first electrical signal having a frequency representative of electrostatic voltage and means for developing a second electrical signal having a frequency representative of electrostatic current, comprising a) a first light source affixed in said applicator and connected to said means for developing said first electrical signal, said first light source emitting light at a first wavelength in correspondence with said first electrical signal;

b) a second light source affixed in said applicator and connected to said means for developing said second electrical signal, said second light source emitting light at a second wavelength in correspondence with said second electrical signal;

c) a fiber optic cable having a first end affixed to said applicator, positioned to receive light from said first and second light sources; said cable having a second end split into two sections;

d) a first-wavelength bandpass filter connected to one of said two sections at the second end of said fiber optic cable, and a second-wavelength bandpass filter connected to the other of said two sections; and a photodetector cell positioned adjacent each of said bandpass filters to respectively receive light passing therethrough and to produce corresponding electrical signals; and e) means for converting said photodetector electrical signals into respective display values identifying the magnitude of said electrostatic voltage and said electrostatic current.

2. The apparatus of claim 1, wherein said fiber optic cable second end is split into two sections having substantial equal numbers of optical fibers.

3. The apparatus of claim 2, wherein said photodetector cells each further comprise photocells respectively sensitive to the bandpass wavelength of the bandpass filter to which it is connected.

4. The apparatus of claim 3, wherein said first wavelength is in the red color band, and said second wavelength is in the green color band.

5. The apparatus of claim 1, wherein said means for converting said photodetector electrical signals further comprises a first circuit channel connected to one of said photodetector cells and a second circuit channel connected to the other of said photodetector cells.

6. The apparatus of claim 5, wherein each of said first and second circuit channels further comprise an amplifier connected to a said photodetector, a counting circuit connected to said amplifier, and a display circuit connected to said counting circuit.

7. The apparatus of claim 6, wherein said display circuit further comprises a decimal numeric display.

8. An apparatus for monitoring two frequency-variable signal parameters in an electrostatic spraying applicator with a single optical cable, comprising a) a first light source electrically connected to one of said frequency-variable signal parameters, said first light source having a first-wavelength light emission characteristic;

b) a second light source electrically connected to the other of said frequency-variable signal parameters, said second light source having a second-wavelength light emission characteristic, different from said first-wavelength;

c) a fiber optic optic cable having a first end positioned to receive light wavelengths from said first and second light sources, and having a second end which is split into a first section and a second section;

d) a first-wavelength bandpass filter connected to the second end first section and a first photodetector positioned to receive light through said first-wavelength bandpass filter;

e) a second-wavelength bandpass filter connected to the second end second section and a second photodetector positioned to receive light through said second-wavelength bandpass filter;

f) a first channel amplifier and display circuit connected to said first photodetector, and having means for developing electrical signal pulses in coincidence with said first light source wavelength emissions, and means for accumulating count values of said signal pulses and displaying said count values as a decimal number; and g) a second channel amplifier and display circuit connected to said second photodetector, and having means for developing electrical signal pulses in coincidence with said second light source wavelength emissions, and means for accumulating count values of said signal pulses and displaying said count values as a decimal number.

9. The apparatus of claim 8, further comprising a focusing lens between said fiber optic cable first end and said first and second light sources.

10. The apparatus of claim 9, wherein said first photodetector is responsive to said first-wavelength light emissions, and said second photodetector is responsive to said second-wavelength light emissions.

11. The apparatus of claim 10, further comprising a timing source connected to both said first and second channel amplifier and display circuits.

12. The apparatus of claim 11, wherein said timing source further comprises means for generating timing signals at approximately one-fourth second intervals.

13. The apparatus of claim 12, wherein said first wavelength is in the red color frequency range, and said second wavelength is in the green color frequency range.

* * * * *